US006579638B2

(12) United States Patent
Brassard

(10) Patent No.: US 6,579,638 B2
(45) Date of Patent: Jun. 17, 2003

(54) REGENERATIVE FUEL CELL SYSTEM

(76) Inventor: Armand Brassard, 173 Paris Rd., Stark, NH (US) 03582

( * ) Notice: Subject to any disclaimer, the term of this patent is extended or adjusted under 35 U.S.C. 154(b) by 86 days.

(21) Appl. No.: 09/903,253

(22) Filed: Jul. 11, 2001

(65) Prior Publication Data

US 2002/0022165 A1 Feb. 21, 2002

Related U.S. Application Data

(60) Provisional application No. 60/217,410, filed on Jul. 11, 2000.

(51) Int. Cl.[7] .............................. H01M 8/18; H01M 8/02
(52) U.S. Cl. .............................. 429/21; 429/17; 429/34
(58) Field of Search .............................. 429/21, 17, 34

(56) References Cited

U.S. PATENT DOCUMENTS 4,196,590 A * 4/1980 Fries
5,506,066 A * 4/1996 Sprouse .......................... 429/21
5,510,202 A * 4/1996 McCoy .......................... 429/19

* cited by examiner

Primary Examiner—John S. Maples
(74) Attorney, Agent, or Firm—Michael J. Persson; Lawson & Persson, P.C.

(57) ABSTRACT

A regenerative fuel cell system. The system includes an electrolyzing device that is placed in communication with an aqueous solution for converting the aqueous solution into a hydrogen gas. An aqueous buoyancy electrical drive is placed in fluid communication with the hydrogen gas produced by the electrolyzing device. This electrical drive includes a means for extracting mechanical energy from the hydrogen gas, and a generator for converting the energy into electrical power. A fuel cell is placed in fluid communication with the hydrogen gas and is adapted to convert the chemical energy in the hydrogen gas and the oxygen into electrical power.

10 Claims, 2 Drawing Sheets

REGENERATIVE FUEL CELL SYSTEM

CLAIM OF PRIORITY

This application claims the benefit of U.S. Provisional Patent Application Ser. No. 60/217,410, filed on Jul. 11, 2000.

FIELD OF THE INVENTION

The present invention relates to the field of power generation and storage and, in particular, to an electrolyzer-fuel cell system with increased efficiency.

BACKGROUND OF THE INVENTION

It is well known that conventional power generating facilities produce more power than is actually needed at most times throughout a given day. This is due, in part, to the fact that it is more cost effective for generators to continue to run at high capacity than to throttle down the amount of power generated, or to completely shut down generators, for the few hours during the day when the demand for electricity is low. Therefore, there is an opportunity to utilize this excess capacity.

A number of prior art systems have been developed to take advantage of this excess power. One type of system, commonly referred to as a potential energy storage system, uses the excess power to store potential energy by pumping water to a higher level for future release through power generating turbines. This system is relatively effective at storing power. However, it requires a large infrastructure, in the form of reservoirs, storage tanks, or the like. Therefore, such potential energy storage devices are not readily adapted to use with many existing power generating facilities. Further, these systems are not readily scalable, as the infrastructure has a finite holding capacity.

Another type of prior art system is commonly referred to as a kinetic energy storage system. One embodiment of this system uses the excess power to accelerate a mass from rest to a high speed, for later coupling to a generator, while another uses the excess power to rotate a massive flywheel to a moderate speed. In each of these embodiments, the inertia of the spinning mass acts to turn the generator to produce electricity. Both embodiments of this system are relatively effective when the storage period is relatively short. However, both of these systems are not effective at storing power for long periods of time. In addition, both are relatively costly, due to the need for costly precision low friction high load bearings to safely support the inertial forces produced by each. Finally, the moderate speed system also requires a significant capital expense, and significant physical space, due to the need for a substantial supporting structure to house the mass.

Still other systems utilize the excess power to charge a chemical battery. These systems store energy in a manner similar to common automotive battery chargers, but utilize vastly more sophisticated batteries that are capable of storing and discharging significantly more power than common lead-acid based automotive batteries. However, these systems have a number of drawbacks that make them undesirable. First, they are relatively large compared to the power that they store. Second, they generally utilize hazardous chemicals, which must be transported, stored and disposed of. Finally, they have a finite number of charge-and-deplete cycles, making them relatively costly.

Another known means for storing power for later use is a regenerative fuel cell, an example of which is found in U.S. Pat. No. 5,506,066. A regenerative fuel cell couples an electrolyzer with a hydrogen fuel cell and is capable of two distinct modes of operation; charging mode, in which electrical energy is consumed and hydrogen and oxygen are produced, and power generation mode, in which hydrogen and oxygen are recombined to produce water and electrical energy is released.

The construction and operation of both an electrolyzer and a hydrogen fuel cell are well known in the art. An electrolyzer typically applies electrical energy to an aqueous solution for the purpose of dissociating molecules to produce hydrogen and other gasses, such as oxygen. One common type of fuel cell includes an anode chamber, a cathode chamber and a proton exchange membrane (PEM), which separates these chambers. Hydrogen is supplied to the anode chamber and oxygen is supplied to the cathode chamber. Electrical energy is produced when the hydrogen and oxygen are combined to form water.

Regenerative fuel cells offer many advantages over the other systems described above. These cells do not require a large initial investment to install, do not require a large amount of space to operate, use non-hazardous materials, will store power for an indefinite period of time, and are, for all practical purposes, infinitely scalable, with excess gas being capable of storage at remote locations, or sold to third parties.

Despite their advantages, the inventor of the present invention has recognized that current regenerative fuel cells fail to capitalize upon the mechanical energy inherent in the production of the constituent gasses. Therefore, there is a need for a system that will fully utilize the benefits of a regenerative fuel cell in order to increase the efficiency of operation of such a cell.

SUMMARY OF THE INVENTION

The present invention utilizes a buoyancy engine in to harness the latent potential energy caused by the change of phase from a liquid to a gas produced by an electrolyzer to increase the system efficiency of a regenerative fuel cell. Buoyancy engines are, themselves, well known in the art. On such engine is described in U.S. Pat. No. 4,196,590. However, the combination of a buoyancy engine with a regenerative fuel cell to harness the inherent imparted by the phase change and increase the efficiency thereof is not known in the art.

In its most basic form, the regenerative fuel cell system of the present invention includes an electrolyzing device that is placed in communication with an aqueous solution for converting the aqueous solution into a hydrogen gas. A buoyancy electrical drive is placed in fluid communication with the hydrogen gas produced by the electrolyzing device. This electrical drive includes a means for extracting mechanical energy from the hydrogen gas, and a generator for converting the energy into electrical power. A fuel cell is placed in fluid communication with the hydrogen gas and is adapted to convert the chemical energy in the hydrogen gas into electrical power by combining it with oxygen.

In operation, the electrolyzing device uses electrical energy to convert the aqueous solution into hydrogen gas, which is at an elevated temperature and pressure. The hydrogen, in its gaseous phase, is then transferred by gravity, pressure, or other transport means, to the buoyancy electrical drive. This drive captures the gas and extracts energy from the gas by harnessing the buoyancy force of the gas. This energy is transferred to the generator, which converts the energy in electrical power. Once depleted of its mechanical energy, the hydrogen is transferred to the fuel cell, which combines the hydrogen with oxygen to harness the chemical energy within the two to produce additional electrical power.

In the preferred embodiment of the system, the electrolyzing device also converts the aqueous solution into an oxygen gas and includes a means for separating the oxygen gas from the hydrogen gas.

The preferred means for extracting mechanical energy is a conveyor system that accepts gas into a plurality of closed ended receptacles, such as vanes or buckets, which are attached to, and extend from the conveyor drive. In this arrangement the outputs of the electrolyzer are released at the bottom of a standing liquid reservoir. The gasses, being of much lower specific gravity that the liquid in the reservoir, rise and are caught by the receptacle. The buoyancy force created by the gasses is the exerted upon the receptacle, causing it to rise and, consequently, to move the conveyor drive. The movement of the conveyor drive drives a generator, which converts the mechanical energy into electrical power. Once the receptacle reaches it apex, the gasses are released and are separated and transferred to the fuel cell. In some embodiment, the receptacle is a bucket having a substantially hydrodynamic shape to reduce system drag. In others, the receptacle is a vane, which folds back along the conveyor drive until it reaches its nadir, at which point it unfolds to catch additional gasses and continue the process.

In one embodiment of the system, the means for extracting mechanical energy includes a first bulb in communication with the hydrogen gas, a second bulb in communication with the oxygen gas, a first pulley for transmitting the energy from the first bulb and to the generator, and a second pulley for transmitting the energy from the second bulb and to the generator. In other embodiments, however, only hydrogen is utilized and the means for extracting mechanical energy includes a single bulb in communication with the hydrogen gas and a pulley attached to the bulb and to the generator. In all such embodiments, however, the pulley(s) each produces electrical energy while rising and falling following the release and transfer of the gas to the fuel cell.

The fuel cell of the preferred embodiment also includes a hydrogen storage tank for storing the hydrogen gas for future use in the generation of electrical power. This tank preferably includes a hydrogen outlet for transferring the hydrogen gas from the hydrogen storage tank to a remote location when the hydrogen storage tank reaches a desired capacity.

The system of the present invention may be utilized in connection with other well-known power generation systems such as windmills, solar panels, or hydroelectric systems in order to increase efficiency and feasibility. Geothermal and heat pump technologies, coupled and combined with the system, could increase efficiency and reduce cost when utilized to heat homes with floor radiant heat systems while producing gas for other services. The system could be coupled with many lesser-known polluted water reclamation systems, including devices that make brown gas or gasses that combine hydrogen and oxygen, in order to increase the efficiency thereof.

In addition to its power storage benefits, the system may also be used as a hydrogen production device at times when the hydrogen is not needed to generate power. In this case, once the hydrogen storage tank is filled, additional gas produced by the system will be transferred to storage tanks for sale to commercial hydrogen producers. Such production may also be accomplished by coupling the system with prior art welding machines with carbon electrodes that act as the electrolyzing device.

Therefore, it is an aspect of the invention to provide a power storage system that does not require a large initial investment to install.

It is a further aspect of the invention to provide a power storage system that does not require a large amount of space to operate.

It is a further aspect of the invention to provide a power storage system that uses non-hazardous materials.

It is a further aspect of the invention to provide a power storage system that will store power for an indefinite period of time.

It is a further aspect of the invention to provide a power storage system that is readily scalable.

It is a still further aspect of the invention to provide a power storage system that operates at increased efficiency due to the use of previously untapped mechanical energy.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
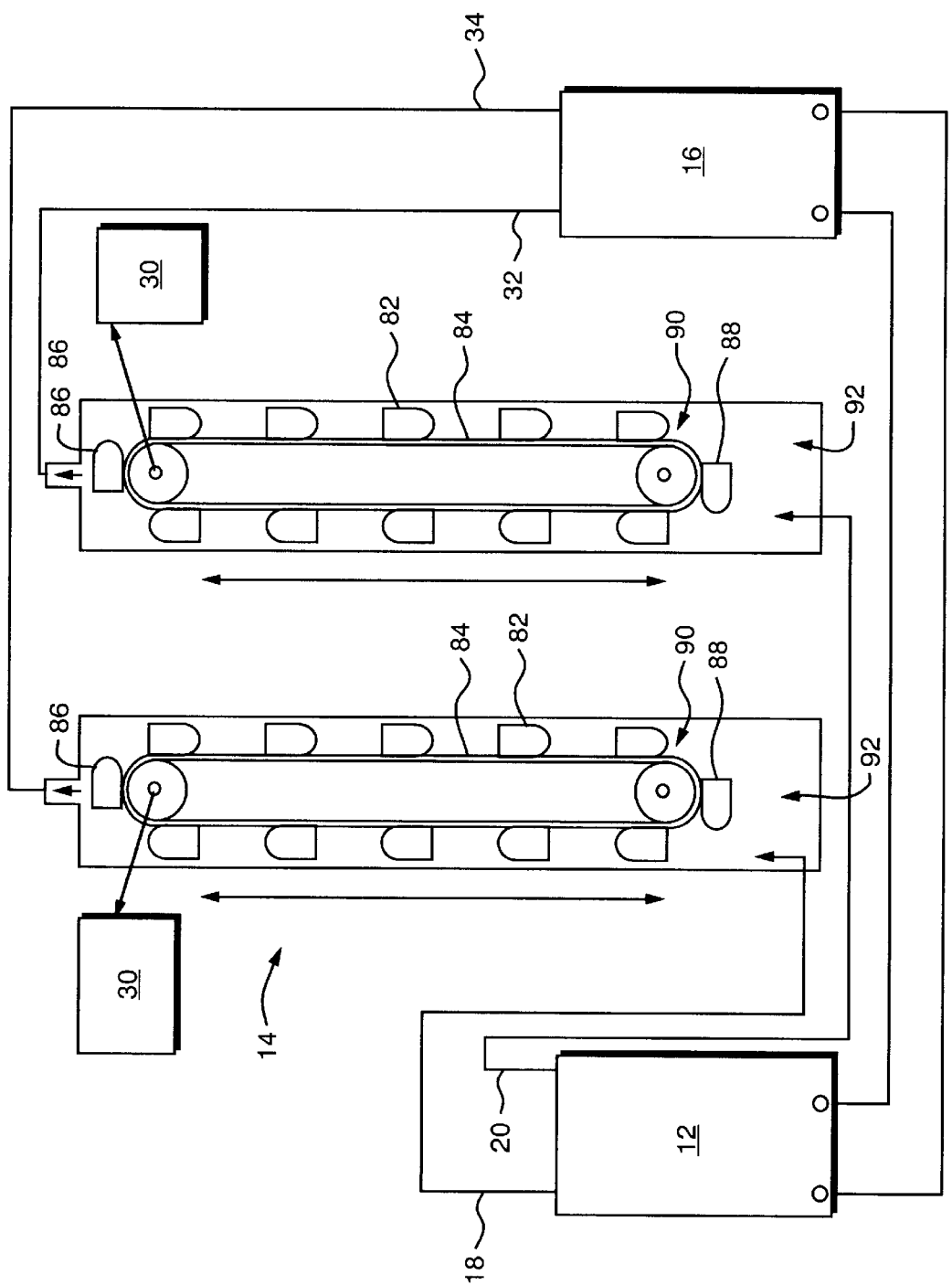
FIG. 1 is a diagrammatic view of the preferred embodiment of the regenerative fuel cell system of the present invention.

Referring first to FIG. 1, the preferred embodiment of the regenerative fuel cell system 10 of the present invention it shown. The preferred system 10 includes an electrolyzing device 12, a buoyancy electrical drive 14, and a fuel cell 16.

The preferred electrolyzing device 12 utilizes an electrical current to generate hydrogen and oxygen gas from an aqueous solution, which serves as the electrolyte. However, it is understood that the electrolyzing device 12 may be any art recognized electrolyzing device for generating a hydrogen gas from a desired electrolyte.

The preferred electrolyzing device 12 includes separator for separating the oxygen gas from the hydrogen gas and feeding the oxygen gas to an oxygen gas output 18 and the hydrogen gas to a hydrogen gas output 20. However, in other embodiments, the separator is eliminated and only hydrogen gas is produced. In still others, gasses other than oxygen are produced and separated from the hydrogen gas. In these embodiments, the other gasses may be utilized with the buoyancy electrical drive 14, but are not fed to the fuel cell for later combination with the hydrogen gas.

The preferred buoyancy electrical drive 14 includes a pair of generators 30, and a pair of conveyor systems 90. In this arrangement the outputs 18, 20 of the electrolyzer 12, here gaseous hydrogen and oxygen, are released at the bottom of a standing liquid reservoir 92. The gasses, being of much lower specific gravity that the liquid in the reservoir, rise and are caught by a bucket 82 extending from the conveyor drive 84. The buoyancy force created by the gasses is the exerted upon the bucket 82 cause it to rise and, consequently, to drive the conveyor drive 84. Each conveyor drive, in turn, drives a generator 30, which converts the mechanical energy into electrical power, which may be fed to the electrolyzer to raise the overall system efficiency, to a battery, or to a power grid for use at a remote location. In some embodiments, the conveyor drives are aligned in-line and are each coupled to a single generator 30 via a flywheel or other art recognized transmission device.

Once the bucket 82 reaches it apex 86, the gasses are released and are separated and transferred to the fuel cell 16, where it is used to generate additional electrical power. In the preferred embodiment, the bucket 82 includes a butterfly valve which traps the gasses on the way up, and folds back to reduce drag after the gasses are expelled. The preferred butterfly valve is simply a circle cut in half with a hinge coupling the two halves together with two half moons cut out the container top but slightly smaller than the flaps on the butterfly made of thin stiff material. In embodiments having a small amount of space, however, half a container shape would be used along with one flap.

In some embodiments of the conveyor system, a vane or blade (not shown) extends from the conveyor drive and catches the rising gas. In these embodiments, after reaching the apex 86, it is preferred that the vane or blade fold back along the conveyor drive until it reaches its nadir 88, at which point it unfolds to catch additional gasses and continue the process. Like the butterfly valve of the preferred embodiment, this folding action acts to reduce drag and increase the overall efficiency of the system.

In another embodiment of the invention, described with reference to FIG. 2, a pair of bulbs 22, 24 that are placed in fluid communication with the oxygen gas output 18 and the hydrogen gas output 20, respectively, and an aqueous solution in which the bulbs 22, 24 are disposed. A first pulley 26 is provided for transmitting the energy from the first bulb 22 to the generator 30, and a second pulley 28 is provided for transmitting the energy from the second bulb 24 to the generator 30. The generator 30 converts the mechanical energy from the bulbs 22, 24 into electrical power and transmits the electrical power to a desired location. In some embodiments, this electrical power is transmitted back to the electrolyzing device 12 in order to reduce the power necessary to produce additional hydrogen and oxygen gas. In others, the electrical power is fed to an output (not shown) and tied to an electrical system for use at other locations.

Figure 2:
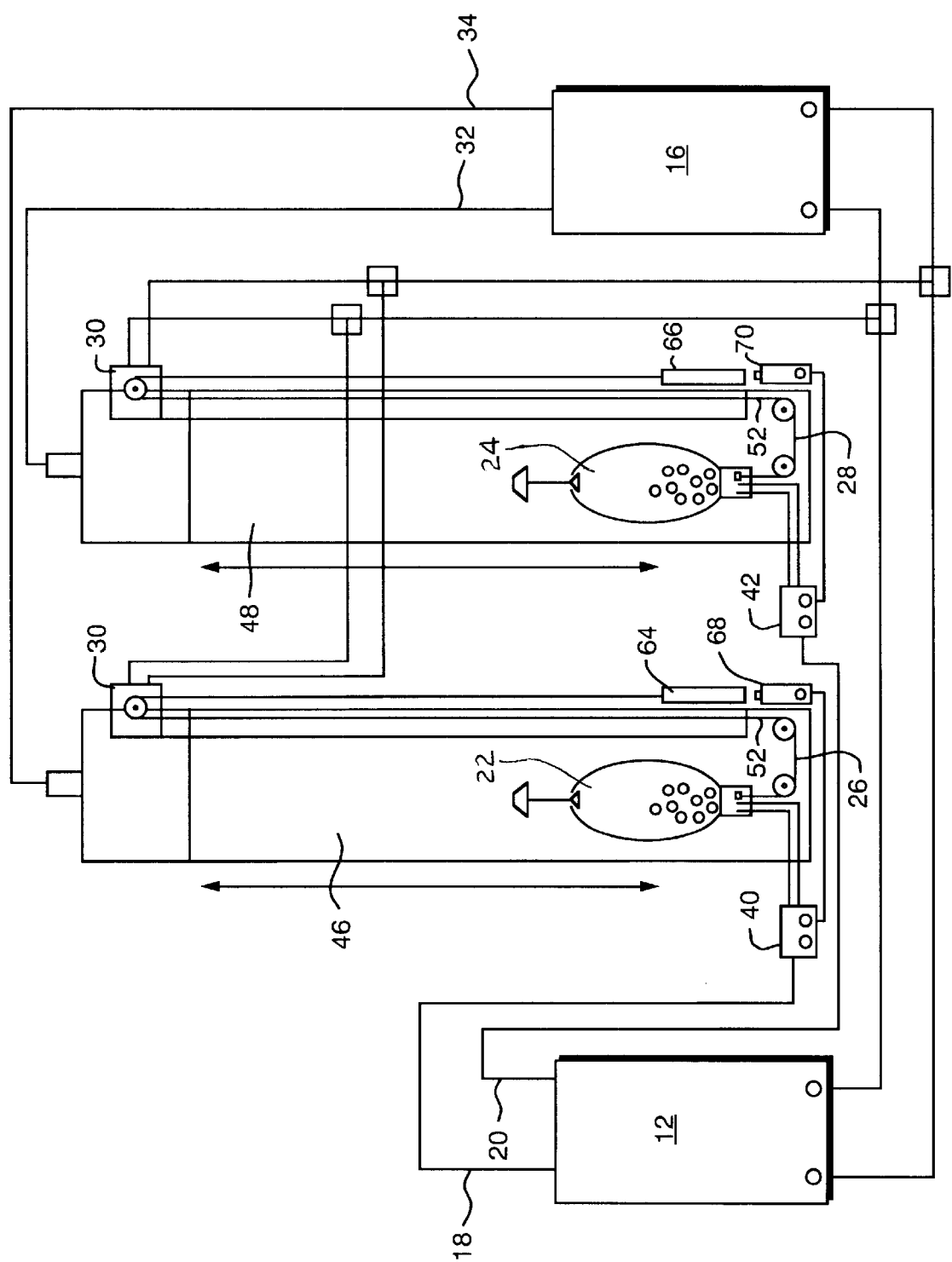
FIG. 2 is a diagrammatic view of another embodiment of the regenerative fuel cell system of the present invention.

In the embodiment of FIG. 2, the electrolyzing device 12 takes electrical power and produces the hydrogen and oxygen gas. The hydrogen gas and oxygen gas are fed to the oxygen gas output 18 and hydrogen gas output 20. The outputs 18, 20 are fed into the bulbs 22, 24 through control valves 40, 42. The bulbs 22, 24 are disposed within containers 46, 48 that are filled with an aqueous solution. The gasses, by direct injection into the bulbs 22, 24, create a buoyancy force within the bulbs 22, 24, which is allowed to increase until the buoyancy of the gasses and bulbs 22, 24 is at such a point that the potential to rise to the top overcomes the physical resistance produced by the pulleys 26, 28, causing the bulbs 22, 24 to rise to the surface of the aqueous solution within the containers 46, 48.

The bulbs 22, 24 are physically attached to connecting cables 50, 52, which run through two eyelet pulleys 26 and up and over the second pulley 28 attached to the generators 30. Accordingly, when the bulbs 22, 24 begin to rise through the aqueous solution, the cable 50 or 52 is pulled and the generator 30 is rotated, effectively generating electrical energy. Upon reaching the surface of the aqueous solution, a valve 60, 62 built into the bulb 22, 24 opens and releases all the gas trapped within the bulb. At Once the gas is released, the bulbs 22, 24 are no longer buoyant and sink back to the bottom of the aqueous solution under the force of counterweights 64, 66. This causes the cable to turn the generators 30 in an opposite direction, again generating electricity, and causes the bulbs 22, 24 to sink back to their start position. The return of the bulbs 22, 24 to the start position activate control switches 68, 70, which open the control valves 40, 42, causing the process to be repeated.

Upon leaving the bulbs 22, 24 the gasses are fed to the fuel cell 16 and are combined to generate electrical power, with a byproduct being the generation of water. In the preferred embodiment, this water is returned to the electrolyzing device 12 for use in the generation of additional hydrogen and oxygen.

In other embodiments of the invention, however, other art recognized buoyancy electrical drives are utilized. For example, in some embodiments, the buoyancy engine described in U.S. Pat. No. 4,196,590, incorporated herein by reference, is modified for use with the electrolyzing device 12 and coupled with a generator 30 to obtain similar results. In others, a turbine (not shown) is coupled to the generator 30 and disposed within the path of the rising gas such that the gas causes the turbine to turn and transmit mechanical energy to the generator 30 for subsequent conversion to electrical energy.

The preferred fuel cell 16 is coupled to gas outputs 32, 34 from the buoyancy electrical drive 14, and recombines the hydrogen and oxygen gas received from the outputs 32, 34 to produce electrical power. As noted above, hydrogen fuel cells are well known in the art and it is contemplated that any art recognized fuel cell 16 might be utilized in connection with the present invention. In some embodiments, the hydrogen and oxygen gases received from the outputs 32, 34 are fed to a hydrogen storage tank and an oxygen storage tank respectively. It is preferred that these tanks each include an outlet for transferring the gasses to remote locations when the tanks are filled to a desired capacity. By providing such an outlet, the system may be run continuously, even when there is no need for the fuel cell to produce electricity, with the excess gas being stored for future use, or sold to commercial gas producers and/or wholesalers.

In all embodiments of the invention, it is preferred that means for extracting mechanical energy from the gas of the electrical drive 14 be immersed in an aqueous solution. This is preferred because the large differential in specific gravity between the gasses and the liquid creates a relatively high buoyancy force. However, it is recognized that the means for extracting mechanical energy from the gas may also be disposed an a gaseous environment, so long as the differential in specific gravity of the gasses is sufficient to impart a buoyancy force to drive the means.

Likewise, in all embodiments of the invention, it is preferred that the buoyancy electrical drive 14 be attached to the generator 30 by means of a variable speed transmission (not shown). The use of such a transmission is preferred as it allows for variations in power generated by the electrical drive 14.

Finally, although the present invention is drawn to a regenerative fuel cell system having an electrolyzer, he concept of harnessing of hydrogen gas by a buoyancy drive and subsequently feeding such gas to a fuel cell may also be applied to gasses formed by other means than the electrolyzer of the present invention. The energy stored within the hydrogen gas is present wherever a supply of energy can be converted or released from molecules under low pressure from natural sources, or pre-pressurized storage sources with low heat, such as is found by converting aluminum waste to hydrogen, or by capping and regulating the gasses coming out of a gas well or biological decomposition. Therefore, it is contemplated that these other hydrogen generation systems may be substituted for the preferred electrolyzer in some embodiments.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A regenerative fuel cell system comprising:

an electrolyzing device in communication with an aqueous solution for converting said aqueous solution into at least a hydrogen gas;

a buoyancy electrical drive in fluid communication with said hydrogen gas produced by said electrolyzing device, said electrical drive comprising a means for extracting mechanical energy from said hydrogen gas, and a generator for converting said mechanical energy into electrical power; and a fuel cell comprising a membrane and a source of oxygen, said fuel cell being in fluid communication with said hydrogen gas and being adapted to extract chemical energy from said hydrogen gas and said oxygen and converting said chemical energy into electrical power.

2. The system as claimed in claim 1 wherein said electrolyzing device further converts said aqueous solution into an oxygen gas, and wherein said electrolyzing device further comprises means for separating said oxygen gas from said hydrogen gas.

3. The system as claimed in claim 1 wherein said fuel cell further comprises a hydrogen storage tank for storing said hydrogen gas for future use in the generation of electrical power.

4. The system as claimed in claim 3 wherein said hydrogen storage tank further comprises a hydrogen outlet for transferring said hydrogen gas from said hydrogen storage tank to a remote location.

5. The system as claimed in claim 1 wherein said means for extracting mechanical energy from said hydrogen gas is a conveyor system.

6. The system as claimed in claim 5 wherein said conveyor system comprises a conveyor drive and a receptacle attached to said conveyor drive.

7. The system as claimed in claim 6 wherein said receptacle is a bucket.

8. The system as claimed in claim 7 wherein said bucket comprises a butterfly valve.

9. The system as claimed in claim 6 wherein said receptacle is a vane.

10. The system as claimed in claim 9 wherein said vane is dimensioned to fold against said conveyor drive upon reaching an apex and unfolding from said conveyor upon reaching a nadir.

* * * * *